June 8, 1965  F. H. MUELLER  3,187,570
BY-PASS FOR FLUID METER
Filed Oct. 10, 1962  3 Sheets-Sheet 1

INVENTOR
FRANK H. MUELLER
BY Cushman, Darby & Cushman
ATTORNEYS

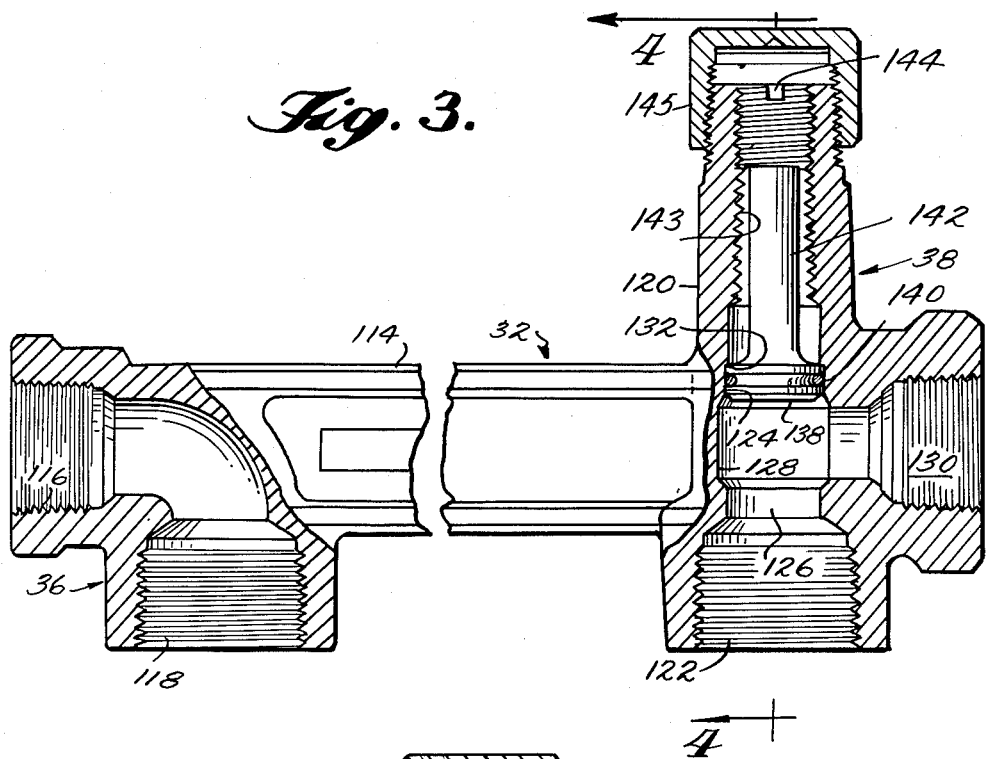
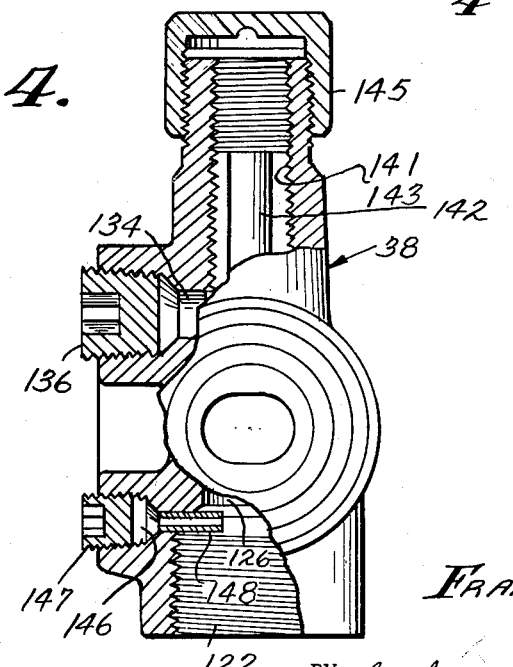

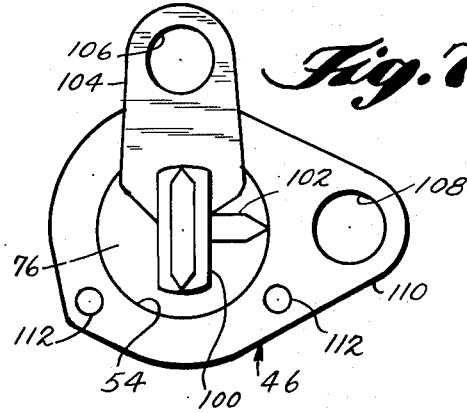
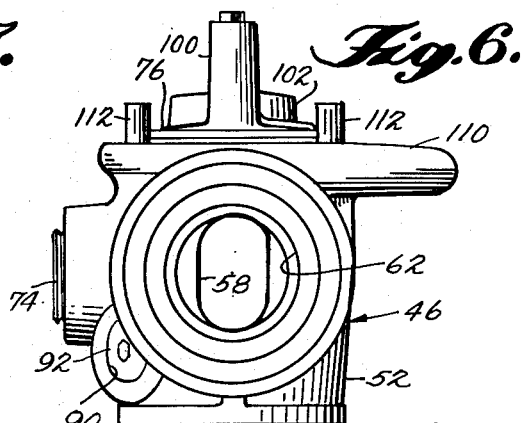
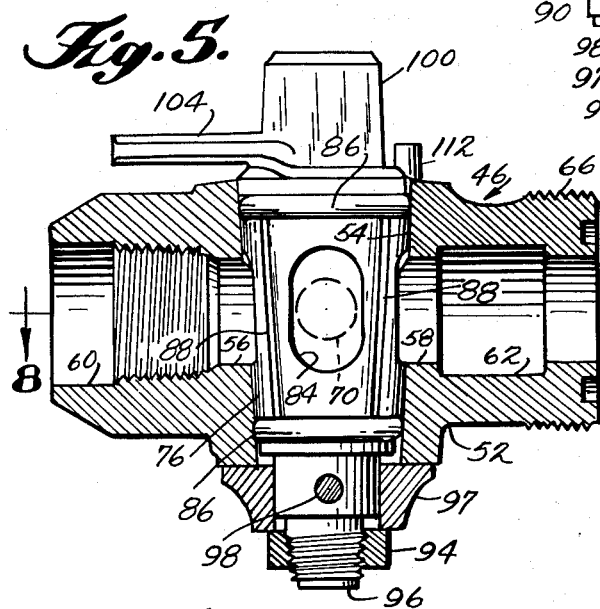
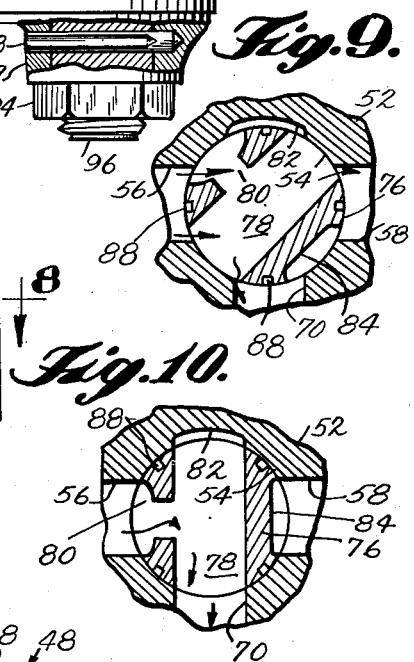
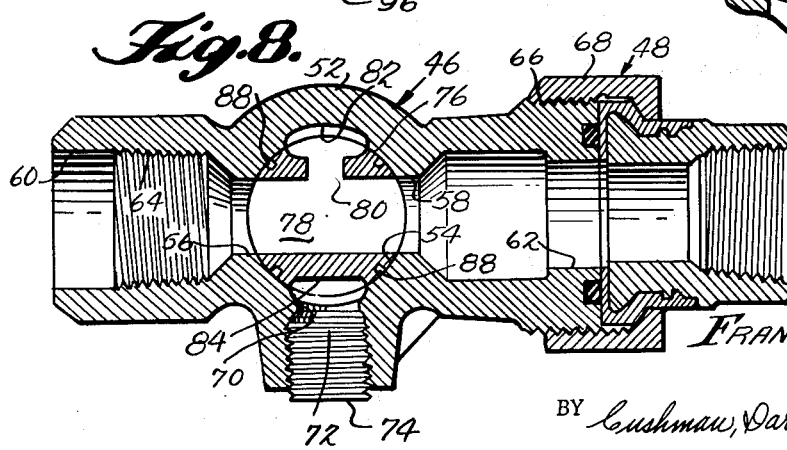

United States Patent Office 3,187,570
Patented June 8, 1965

3,187,570
BY-PASS FOR FLUID METER
Frank H. Mueller, Decatur, Ill., assignor to Mueller Co., Decatur, Ill., a corporation of Illinois
Filed Oct. 10, 1962, Ser. No. 229,704
17 Claims. (Cl. 73—201)

This invention relates to a by-pass type meter installation or setting and, more particularly, to an improved arrangement wherein a fluid meter can be removed from a fluid service line, such as a gas line, without interrupting service.

It is an established practice among many gas utility companies to remove, inspect, clean, repair and replace their gas meters after the latter have been in service for a period of time. Where the meter is a residential gas meter, difficulty is presented to its removal and replacement, in that any stoppage of gas flow will cause pilot lights to be extinguished in gas operated appliances, such as stoves, refrigerators, hot water heaters, etc. When service is then restored, there is a possibility that the relighting of one or more pilot lights will be forgotten, putting the residence in a dangerous condition. Even if the gas flow is not stopped during the meter replacement, a sudden surge of gas, if permitted, blows out the pilot lights.

Various prior attempts have been made to provide a system for replacing fluid service meters. These prior systems fall short in that they cause the interruption of fluid service or a fluid surge at some time during the replacement, require a number of expensive special parts, are too cumbersome and difficult to operate, or are of such inflexibility that they will not fit and therefore cannot be employed in confined areas.

It is, therefore, an object of the present invention to provide an improved by-pass type meter setting in which a fluid meter can be removed from a fluid service line without interrupting service.

It is another object of the present invention to provide an improved by-pass type meter setting wherein a fluid meter can be removed from a fluid service line and replaced with the same or a separate meter without interruption of service and without causing a fluid surge in the line.

Yet another object of the present invention is to provide a by-pass type meter setting which can be employed in confined areas.

A further object of the present invention is to provide a by-pass type meter setting that can be operated by persons of limited skilled with a minimum of instruction.

It is another object of the present invention to provide a by-pass type meter setting that can be operated without using special tools.

It is another object of the present invention to provide a by-pass type meter setting that is substantially tamper-proof.

Yet another object of the present invention is to provide a by-pass type meter setting that is simple in construction with resulting economies of manufacture and installation.

It is a further object of this invention to provide an improved meter stop that can be used for by-passing purposes.

These and other objects and advantages of this invention will be more clearly understood from the following detailed explanation and attached drawings, wherein;

FIGURE 3 is a vertical sectional view of the meter bar shown in FIGURE 1;

FIGURE 4 is a sectional view taken on line 4—4 of FIGURE 3;

FIGURE 5 is a vertical sectional view of the meter stop shown in FIGURE 1;

FIGURE 6 is an end view of the stop shown in FIGURE 5 and taken from the right-hand end of the latter;

FIGURE 7 is a top view of the stop shown in FIGURE 6;

FIGURE 8 is a sectional view taken on line 8—8 of FIGURE 5;

FIGURE 9 is a fragmentary view corresponding to FIGURE 8, but showing an intermediate position of the valve; and FIGURE 10 is a view corresponding to FIGURE 9, but showing the by-passing position of the valve.

Figure 1:
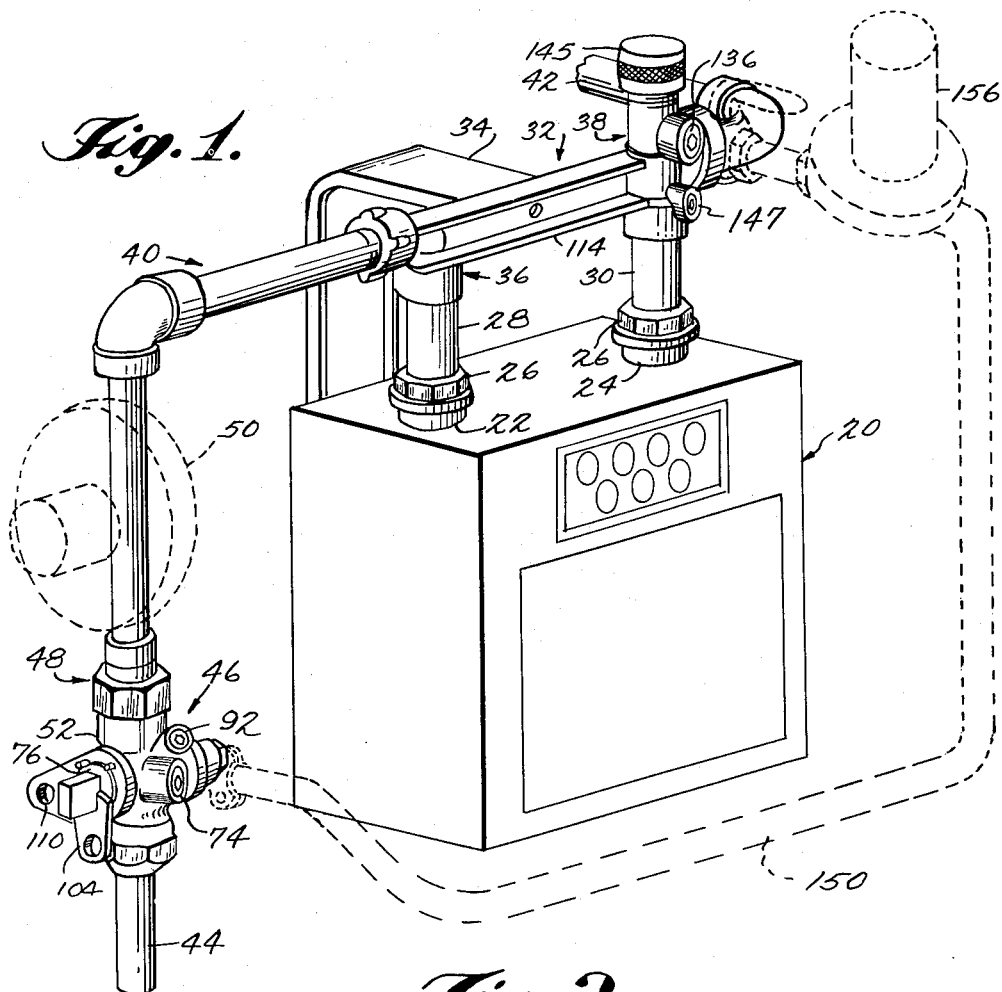
FIGURE 1 is a perspective view of a meter setting embodying this invention.
Figure 2:
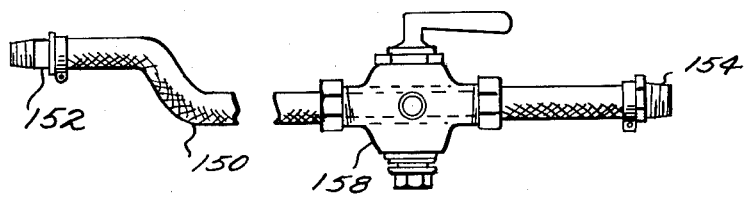
FIGURE 2 is a side elevational view of the by-pass line shown in dotted lines in FIGURE 1.

Referring now to FIGURE 1 of the drawings, a conventional gas meter 20 has an inlet conduit 22 and outlet conduit 24 projecting therefrom. Inlet conduit 22 and outlet conduit 24 are each secured, as by unions 26, to nipples 28 and 30, respectively, which suspend the meter, in conventional manner, from a meter bar or hanger 32 embodying this invention and supported, conventionally, by a bracket 34. The meter bar 32 embodies integral inlet and outlet fittings 36 and 38, respectively, at its opposite ends for connecting the meter 20 between a service line 40 and a supply pipe 42 leading to house piping (not shown). The inlet fitting 36 is of the conventional elbow type while the outlet fitting 38 is of a special by-pass type embodying the invention, as explained more in detail hereinafter. Although the fittings 36 and 38 are shown as being integral with each other, i.e., incorporated in a meter bar, they may be separate and independent fittings in the event no meter bar is used to support the meter.

The service line 40 includes a conventional riser pipe 44 into which is connected a meter stop or rotary plug valve 46 embodying this invention and similar to the one disclosed in United States patent to Mueller, No. 2,653,-791. Preferably, the stop 46 is connected to the downstream side of the line 40 by an insulated coupling 48 of the type disclosed in greater detail in the copending application of Bowan et al., Serial No. 860,303, now U.S. Patent No. 3,115,354. If gas is supplied to the service line 40 under high pressure, such pressure must be lowered before it enters a residence. For this purpose, a conventional pressure regulator or reducing valve 50, shown in dotted lines, can be connected into the service line 40 between the meter stop 46 and the meter bar 32.

As best shown in FIGURES 5 through 10, the meter stop 46 embodying this invention is a modification of the lubricated meter stop disclosed in the aforementioned U.S. Patent No. 2,653,791. The stop 46 includes a body 52 provided with a tapered valve seat 54 having diametrically aligned inlet and outlet ports 56 and 58 communicating, respectively, with aligned inlet and outlet passageways 60 and 62. The inlet passageway 60 may be provided with interior threads 64 for connection to the upstream end of the riser pipe 44, while the valve body 52 surrounding the terminal end of the outlet passageway 62 may be provided with exterior threads 66 for engagement by a coupling nut 68 (FIGURE 8) to connect the outlet passageway with the downstream side of the service line 40 by an insulated coupling 48 of the type described more in detail in the aforementioned application of Bowan et al.

Circumferentially midway between the seat ports 56 and 58, the seat 54 also is provided with a by-pass port 70 communicating directly with a by-pass passageway 72 in the body 52. The outer end of the by-pass passageway 72 normally is closed by an exteriorly threaded closure plug 74.

Rotatably mounted in the seat 54 is a tapered key or valve plug 76 provided with a diametric passageway 78 alignable with the inlet and outlet seat ports 56 and 58 in the open position of the valve 46 in order to permit flow to take place through the inlet and outlet passageways 60 and 62, as shown in FIGURE 8. The plug also is provided with a radial passageway 80 that intersects the diametric passageway 78 at right angles to the latter and is adapted to register with the seat inlet port 56 in the by-passing position of the valve 46, as shown in FIGURE 10. In this latter position, it will be noted that flow can take place from the inlet passageway 60 through the radial passageway 80 and diametric passageway 78 to the by-pass passageway 72. In the closed position of the valve 46 (not shown) the plug 76 is rotated 180° from the position shown in FIGURE 10, so that the seat inlet port 56 is blocked. The seat ports 56, 58 and 70, and plug passageways 78 and 80 are so proportioned that the plug 76 can be turned to an intermediate position, between open and by-passing positions as shown in FIGURE 9, wherein flow can take place from the inlet passageway 60 to both the outlet passageway 62 and the by-pass passageway 72.

Preferably, the valve seat 54 is provided with a false port 82 which registers with the radial plug passageway 80 in the open position of the valve 46, while the valve plug 76 is provided with a false port 84 registerable with the seat by-pass port 70 in the open position of the valve, as shown in FIGURE 8, in order to eliminate seat and valve plug sealing surfaces that would be exposed to line fluids, with resulting possible corrosion of such surfaces, in the open, closed, and by-passing positions of the valve 46.

As disclosed in greater detail in the aforementioned Mueller patent, the valve plug 76 preferably is provided adjacent its larger and smaller ends with circumferential grooves within which are disposed resilient pressure-deformable packing rings 86, illustrated in the drawings as being in the form of O-rings, which provide an effective seal between the valve plug and the valve seat 54 adjacent the opposite ends of the latter. Longitudinal lubricant channels 88 in the plug 76 extend between and connect the O-ring grooves, so as to form therewith a closed lubricant system. Lubricant can be introduced into the system through a radial charging port 90 (FIGURE 6) in the body 52 which registers with one of the longitudinal channels 88 in the plug 76 in the open, closed, or by-passing positions of the latter. The outer end of the charging port 90 is enlarged and interiorly threaded for the reception of an exteriorly threaded closure plug 92.

The valve plug 76 is retained in its seat 54 by a nut 94 engaged with a reduced threaded extension 96 on the smaller end of the plug and bearing against a washer 97 that, in turn, bears against an annular bearing surface on the body 52 at the small end of the valve seat 54. Preferably, the washer 97 is locked to the plug 76 by a retaining pin 98 which extends through one side of the washer, through the extension 96 on the small end of the plug, and into a blind socket in the other side of the washer, in order to render the valve 46 substantially tamper-proof, all as disclosed in greater detail in the aforementioned Mueller patent.

The larger end of the plug 76 is provided with a substantially flat wrench-engageable extension 100 for rotating the plug to open and close the valve 46, such extension being aligned with the diametric passageway 78 in the plug so as to provide an exterior indication of the position of such passageway. Beside the extension 100, is a radial indicia marking 102 (FIGURE 7) aligned with the radial by-pass passageway 80 in the plug 76 for exteriorly indicating the position thereof. The larger end of the plug also is provided with a radial lock-wing 104 having an aperture 106 therethrough alignable with a corresponding aperture 108 in a fixed lock-wing 110 on the body 52 in the closed position of the valve so as to permit the insertion of a locking device, such as a padlock (not shown), through both such apertures in order to lock the valve 46 in its closed position. The valve body 52 also is provided, adjacent the larger end of the valve seat 54, with two projections or extensions 112 that serve as stops or checks alternatively engageable by the lock-wing 104 on the plug 76 to limit rotary movements of the latter to 180° in moving between closed, open, and by-passing positions. The stops 112 also prevent the plug 76 from being turned to a position wherein the valve 46 is open and the plug by-passing passageway 80 registers with the seat by-pass port 70. If the body closure plug 74 were inadvertently removed with the valve in such position, gas would escape to the atmosphere.

As best shown in FIGURES 1, 3 and 4, the meter bar 32 of the invention comprises a rail-like center portion 114 having at its opposite ends thereof and integral therewith, the inlet and outlet fittings 36 and 38. It will be realized, however, that these fittings may be separate from each other in the event that a meter bar or meter hanger is not employed. As mentioned before, the inlet fitting 36 simply is in the nature of an elbow having an interiorly threaded inlet 116 and an interiorly threaded outlet 118 for connection with the downstream end of the service line 40 and the nipple 28, respectively. The outlet fitting 38 is somewhat in the nature of a spool valve having a body 120 provided at its lower end with an interiorly threaded inlet 122 for connection therein of the nipple 30 leading to the outlet 24 of the meter 20. The body 120 also is provided with a through bore aligned with the inlet 122 and having upper and lower cylindrical sections 124 and 126 of the same uniform diameter, separated by an enlarged bore section 128. Communicating with the bore section 128 is a lateral outlet 130 having an enlarged and interiorly threaded outer end for connection thereto of the line 42 leading to the house piping. Above the bore section 124 the body 120 is reduced to form a downwardly facing shoulder 132 and is provided with a by-pass port 134 normally closed by a detachable closure in the form of a threaded plug 136 having a socket in its outer end for reception of an Allen wrench (not shown). Movable longitudinally in and between the bore sections 124 and 126 is a spool valve member 138 provided with a circumferential groove in which is disposed an O-ring 140 slidingly engageable with the wall of the bore sections 124 and 126 to seal therewith and with the valve member. The valve member 138 has a stem 142 provided with threads engaged with corresponding threads in a reduced upper section 143 of the body bore so that rotation of the stem, by an appropriate wrench, e.g. a screwdriver engaged in a kerf 144 in the stem (not shown) will serve to advance or retract the valve member 138. Preferably, the upper end of the bore in the body 120 is protected by a weather cap 145 secured onto the upper end of the body. Below the bore section 126, the body 120 is provided with a lateral purge port 146 normally closed by a detachable closure 147, here shown as being in the form of a threaded plug having an Allen-wrench-receivable socket in its outer end. A tubular roll-pin 148 may be force-fitted into the inner end of the port 146 and project inwardly beyond the wall of the bore section 126 to prevent movement of the valve 138 below the bore section 126. The pin 148 also restricts the purge port 146 for reasons later described. In its uppermost position the valve 138 engages with the shoulder 132 to prevent movement upwardly past the by-past port 134.

From the foregoing construction it will be seen that the valve member 138 is movable between three positions, an upper position, shown in FIGURE 3, wherein it will block off flow between the by-pass port 134 and the lateral outlet 130, an intermediate position in the bore section 128 wherein flow can take place from both the inlet 122 and the by-pass port 134 to the lateral outlet 130, and a lower position in the bore section 126 wherein flow from the inlet 122 to the lateral outlet 130 is blocked.

Referring now to FIGURE 1 of the drawings, in order to use the installation shown for by-passing purposes, with the meter stop 46 in its open position the plug 74 closing the by-pass passageway 72 is removed and the inlet end of a flexible by-pass line 150, having appropriate connection fittings 152 and 154 at its opposite ends, is connected to the by-pass passageway 72. If the service line 40 has a pressure regulator therein, the line 150 also will have a pressure regulator 156, similar to the regulator 50, connected thereinto. Preferably the line 150 also has a bleed valve 158 connected thereto adjacent its outlet end, i.e. adjacent the end remote from the valve 46. The plug 136 closing the by-pass port 134 of the outlet fitting 38 on the meter bar 32 then is removed, while the valve member 138 is in its upper position blocking flow from the by-pass port 134 to the lateral outlet 130, and the outlet end of the by-pass line 150 is connected to the by-pass port 134. After the line 150 has been so connected, the meter stop 46 is turned to its intermediate position wherein flow can take place from the inlet passageway 60 through both the line 40 and the by-pass line 150. The bleed valve 158 then is opened to allow incoming gas to purge the line 150 of air after which the valve 158 is closed to allow the gas pressure in the service line 40 to build up in the by-pass line 150. The valve member 138 in the outlet fitting 38 then is moved to its lower position wherein flow can take place through the fitting only from the by-pass line 150 to the pipe 42 and flow from the meter 20 to the pipe 42 is blocked. Thereafter, the meter stop 46 is turned to its by-passing position to block all flow to the meter 20 and direct all flow of gas to the dwelling through the by-pass line 150. Thereupon the meter unions 26 can be unscrewed and the meter 20 detached for replacement or repair.

It will be noted that the foregoing procedure serves to by-pass the gas around the meter 20 without any surges in or interruption of the flow of gas to the dwelling so that there is no possibility of extinguishing pilot lights, and thus creating a potentially dangerous situation.

After the meter 20 has been repaired and it, or a new meter, has been reconnected to the meter hanger 32, service is re-established by following a substantially reverse procedure. First of all, the closure plug 147 for the purge port 146 in the fitting 38 is removed and the meter stop 46 turned to its intermediate position so that gas will flow through the line 40 and through the meter 20, as well as through the by-pass line 150. Gas is allowed to flow in this manner until the line 40 and the meter 20 have been purged of air. This usually can be determined by watching the dials on the meter 20 since the volumetric capacity thereof normally is known. In this connection, the purge port 146 is restricted by the pin 148 to prevent any excessive loss of pressure in the by-pass line 150 which might extinguish pilot light during this purging operation. After the line 40 and meter 20 have been so purged, the closure plug 147 for the purge port 146 is reinserted and tightened. The valve member 138 in the fitting 38 then is moved to its upper position to permit gas to flow only through the meter 20 to the pipe 42. The meter stop 46 then is turned to its full open position to block all flow of gas into the by-pass line 150 so that the latter can be disconnected from the fitting 38 and the meter stop 46, and the closure plugs 136 and 74 replaced. The cap 145 then is screwed onto the top of the fitting 38 to protect the same from the weather.

It will be noted particularly that the meter stop 46 is constructed with diametrically aligned inlet and outlet passageways 60 and 62 and with a plug diametric passageway 78 to provide a straight flow way, in the open position of the stop, which will enable the stop to be removed or replaced, if desired, by a stop-changer of the type shown in the patent to Bowan 2,867,034.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A by-pass type fluid meter setting comprising: a fluid line; a fluid meter detachably connected into said line; a first valve connected into said line upstream of said meter and having a body provided with a by-pass port and a removable closure for said port, said valve having at least three positions, an open position wherein flow takes place therethrough to said meter and flow to said port is blocked, an intermediate position wherein flow takes place from the upstream side of said line to both said by-pass port and said meter, and a by-pass position wherein flow takes place from the upstream side of said line to said port and flow to said meter is blocked; a second valve connected into said line downstream of said meter and having a body provided with a by-pass port and a removable closure for said port, said second valve having at least three positions, an open position wherein flow takes place therethrough from said meter and flow from said port is blocked, an intermediate position wherein flow takes place from both said meter and said port to the downstream side of said line, and a by-pass position wherein flow takes place from said port to the downstream side of said line and flow from said meter is blocked; and a by-pass line detachably connectable to and between said by-pass ports of said valves on removal of said closures.

2. The structure defined in claim 1 wherein the first valve has a fourth closed position wherein flow is blocked from the upstream side of the line to both the by-pass port and the meter.

3. The structure defined in claim 1 wherein the first valve has a fourth closed position wherein flow is blocked from the upstream side of the line to both the by-pass port and the meter, and wherein said first valve is of the rotary plug type and includes stop means preventing rotation of the plug to a fully open position wherein flow can take place from the upstream side of the line to both the meter and the by-pass port.

4. The structure defined in claim 1 including a meter bar detachably suspending the meter and wherein the second valve has a body integral with said bar.

5. The structure defined in claim 1 wherein the first valve is of the rotary plug type and the second valve is of the spool type and includes a body and a valve member therein provided with a stem threadedly engaged with body for linearly moving said valve member on rotation of the stem.

6. The structure defined in claim 1 wherein the second valve is of the spool type and includes a body provided with a through bore and a lateral outlet connected to the downstreams side of the line, one end of said bore being connected to the meter, and a valve spool reciprocable in said bore and having a stem threadedly engaged with said body and accessible from the other end of said bore.

7. The structure defined in claim 1 wherein the second valve has a purge port in constant communication with the meter and including a removable closure for said purge port.

8. The structure defined in claim 7 wherein the purge port has a restriction therein.

9. The structure defined in claim 1 wherein the second valve is of the spool type and includes a body provided with a through bore and a lateral outlet connected to the downstream side of the line, one end of said bore being connected to the meter, and a valve spool reciprocable in said bore and having a stem threadedly engaged with said body and accessible from the other end of said bore, said body having a purge port adjacent said one bore end in constant communication with the meter, and further including a removable closure for said purge port.

10. A by-pass type rotary plug valve comprising: a body provided with a circular valve seat intersected by diametrically aligned inlet and outlet passageways and by a by-pass passageway disposed circumferentially between said inlet and outlet passageways; a closure for the outer end of said by-pass passageway detachably engageable with said body; and a valve plug rotatable in said seat and having a diametric passageway alignable with said inlet and outlet passageways in an open position of the valve and a radial passageway intersecting said diametric passageway at right angles thereto and registrable with said by-pass passageway in a by-pass position of the valve, said passageways being proportioned so that in an intermediate position of said plug, angularly between said open and by-passing positions, flow can take place from said inlet passageway to both said outlet and by-pass passageways.

11. The structure defined in claim 10 including interengageable means on the body and plug for preventing rotation of the latter to a position wherein the diametric plug passageway is aligned with the body inlet and outlet passageways and the plug radial passageway is in register with the body by-pass passageway.

12. The structure defined in claim 11 in which the means on the plug comprises a lock wing, and including a lock wing on the body, said plug lock wing being aligned with said body lock wing in a plug position wherein the inlet passageway is blocked by the plug.

13. A by-pass type outlet fitting for a fluid meter comprising: a body provided with a through bore having an inlet end, a lateral outlet communicating with said bore between the ends thereof, and a by-pass port communicating with said bore at a location spaced longitudinally from said outlet and on the opposite side thereof from said bore inlet end, said bore having sections of the same uniform diameter on opposite sides of said outlet; a closure for said port detachably engageable with said body; means on said body adjacent said bore inlet end and adjacent said outlet for detachably connecting the same respectively to the outlet of a fluid meter and to a supply pipe; a spool valve in said bore sealingly engageable with said bore sections and selectively movable therebetween into an open position to block flow between said by-pass port and said outlet, an intermediate position to permit flow from both said by-pass port and said bore inlet end to said outlet, or a by-pass position to block flow between said bore inlet end and said outlet; and stem means on said valve threadedly engaged with said bore adjacent, and accessible from, the other end thereof.

14. The structure defined in claim 13 including a meter bar having at one end thereof an integral elbow type inlet fitting and at the opposite end thereof the outlet fitting with the body of the latter integral with the bar.

15. The structure defined in claim 13 in which the body is provided with a lateral purge port communicating with the bore between its inlet end and the lateral outlet, and including a closure for said purge port detachably engageable with said body.

16. The structure defined in claim 15 in which the purge port is restricted.

17. The structure defined in claim 13 in which the connecting means adjacent the bore inlet end comprises an interior thread.

References Cited by the Examiner
UNITED STATES PATENTS

| | | | |
|---|---|---|---|
| 592,187 | 10/97 | Berr | 251—286 |
| 2,169,043 | 8/39 | Goehring | 137—599.1 |
| 2,579,656 | 12/51 | Douglas et al. | 73—201 |
| 2,632,328 | 3/53 | McChesney | 73—201 |
| 2,855,042 | 10/58 | Kryzer | 137—599.1 X |

FOREIGN PATENTS 4,411 1/92 Switzerland.

RICHARD C. QUEISSER, *Primary Examiner.*
JOSEPH P. STRIZAK, *Examiner.*